UNITED STATES PATENT OFFICE.

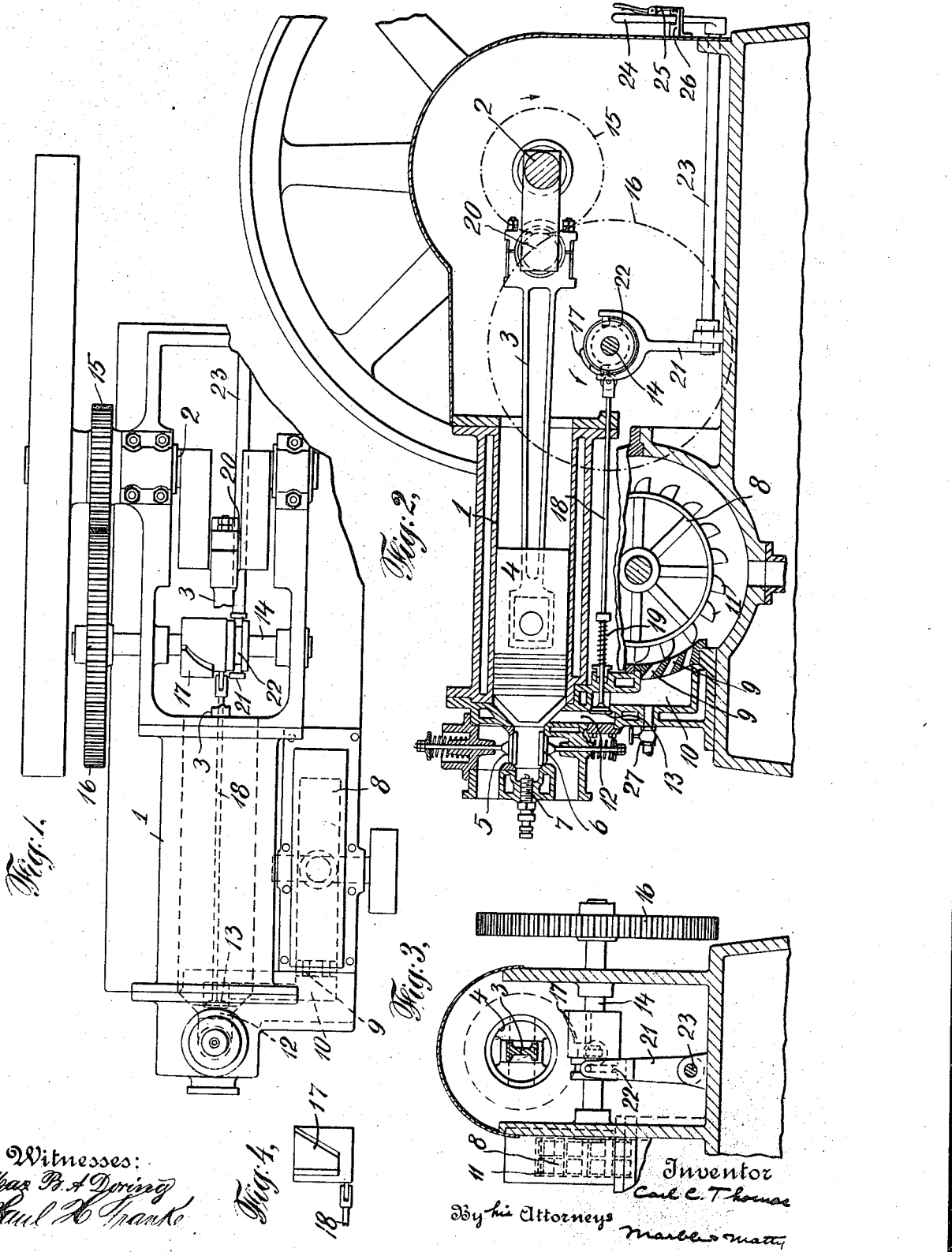

CARL C. THOMAS, OF MADISON, WISCONSIN.

COMBINED INTERNAL-COMBUSTION ENGINE AND TURBINE AND PROCESS OF CONVERTING HEAT ENERGY INTO POWER.

1,147,280.

Specification of Letters Patent.   Patented July 20, 1915.

Application filed April 11, 1913.   Serial No. 760,496.

*To all whom it may concern:*

Be it known that I, CARL C. THOMAS, a citizen of the United States of America, and a resident of Madison, in the county of Dane and State of Wisconsin, have invented certain new and useful Combined Internal-Combustion Engines and Turbines and Processes of Converting Heat Energy Into Power, of which the following is a specification.

My invention relates to combined internal combustion engines and turbines, and to processes of converting heat energy into power and as an apparatus comprises a structure wherein an internal combustion engine serves as means for compressing and igniting an explosive charge, a portion of which explosive charge then acts on the piston of such engine to maintain the cycle of that engine and, if desired, to do work external to the engine, another portion of the gaseous product of ignition of the charge being delivered, while at high pressure, to a suitable turbine, wherein it performs useful work.

My invention further comprises means for varying the proportion of the gases so delivered to the turbine, to the gases retained in the engine cylinder to do work therein.

As a process my invention comprises the injection of a liquid such as water into the hot high pressure gas delivered by the engine to the turbine, such water or other liquid being converted into steam by the heat of such gas, and, by the absorption of latent heat incident to such conversion, cooling the gas, at the same time greatly increasing the specific gravity of the fluid acting upon the turbine and decreasing the velocity of such fluid; the result being a considerably increased efficiency over that which would be obtained were such water or other fluid not injected. As a result of such injection of water, the turbine is to be considered as a combined steam and gas turbine.

I am aware that heretofore turbines have been operated by the exhaust gas discharged from internal combustion engines. But such exhaust gas is discharged at relatively low pressure, as compared with the pressure at the beginning of the working stroke of the engine, and hence such exhaust-operated turbines have had but little power. But according to my invention gas is delivered from the engine cylinder to the turbine at or near the beginning of the working stroke of the engine, such gas being thereby delivered to the turbine at high pressure, for which reason the turbine is able to do considerable work.

My invention is particularly applicable to gas engines which are of much greater capacity than is necessary for much of the work which the engine is called upon to do, so that the engine, much of the time, is operating under light load, and therefore can well spare a considerable proportion of the gaseous product of combustion, at or near the beginning of the working stroke, for the operation of a turbine. It frequently happens that a gas engine of much greater power than that required to carry the normal load, must be used because at times this engine must carry an abnormal load. It also frequently happens that the gas engine is not, itself, well adapted for certain work to be done (for example, the driving of cream separators) because of its relatively low speed, as compared with the speed at which certain machinery (cream separators for example) require to be driven. Taking the cream separator as representative of various machinery requiring to be driven at high speed; the cream separator itself, even if of quite large capacity, requires no great amount of power to drive it, but it must be driven at very high speed; a speed so high that direct drive of such separator from a gas engine of efficient type is not practicable, and the gearing or belting required to drive the separator at proper speed from a gas engine of ordinary speed is expensive in first cost and in maintenance, takes up much room, and is otherwise objectionable. A turbine operated by gas delivered from a gas engine, however, normally has a high speed of rotation, and hence is well adapted to drive the separator direct, or through simple transmission gearing of low speed ratio.

The object of my invention is to facilitate the operation of machinery, particularly high speed machinery, by internal combustion engines, and to do this by simple and inexpensive means.

I will now proceed to describe my invention with reference to the accompanying drawings, and will then point out the novel features in claims.

In the drawings: Figure 1 shows a plan view of a portion of a combined gas engine and turbine embodying my invention; Fig. 2 shows a longitudinal section of the engine and turbine, the upper portion of the turbine being broken away; Fig. 3 shows a transverse section of the engine, looking toward the rear, and Fig. 4 shows a detail top view of a valve-operating cam employed in the engine.

In the drawings, 1 designates the engine cylinder, 2 the crank shaft thereof, 3 the connecting rod thereof, and 4 the piston thereof. I have shown an engine of what is known as the four cycle type, but in a broad sense it is immaterial whether the engine employed be of the four cycle type or of the two cycle type. The engine shown is provided with the usual admission valve 5, exhaust valve 6 and igniter 7. I have not shown any particular mechanism for operating the admission and exhaust valves, and it will be understood that these valves may be operated by any suitable or customary valve gear.

8 designates the rotor of the turbine, mounted, in the particular construction shown, alongside the engine, though this particular location of the turbine is immaterial, and 9—9 a series of nozzles arranged to project fluid under pressure, supplied to said nozzles 9 from a chamber 10, against the buckets or vanes 11 of the rotor. Any suitable type of turbine may be employed. That shown is of the general impulse type.

A port 12 leads from the rear or explosion end of the engine cylinder to the chamber 10, and flow through this port is controlled by means of a puppet valve 13 operated by suitable valve gear. I do not limit myself to the use of any particular valve gear for operating this valve 13, though the valve gear shown is convenient for the purpose, comprising a shaft 14 driven by suitable reducing gears 15 and 16 from the crank shaft 2 of the engine, upon which shaft 14 is mounted a sliding taper cam 17, adapted to actuate a valve rod 18 connected to the puppet valve 13. A spring 19 tends to hold valve 13 closed. The position of the cam 17 is such, with respect to the position of the main crank pin 20 of the engine, that valve 13 is opened at or just following the beginning of the working stroke of piston 4 so that gases at full or nearly full initial pressure are delivered from the engine cylinder through port 12 to chamber 10, and thence through nozzles 9 to the buckets 11 of the turbine. The cam 17 is a taper cam, as shown particularly in Fig. 4, from which it will be seen that by adjusting this cam longitudinally with respect to its shaft 14, the period during which the valve 13 remains open may be varied. Preferably the cam 17 is of such design, as shown, that the valve 13 always opens at about the same portion of the stroke of the piston 4, the variation in the duration of the period of opening of this valve being effected by varying the point of closure of this valve, or cut-off, with respect to the stroke of piston 4. Thereby the proportion of gases delivered from the engine cylinder to the turbine, to the gases retained within that engine cylinder to operate the engine and to permit the engine to do external work, may be varied as desired.

Since the turbine will naturally operate at very high rotative speed (the speed at which it operates depending partly upon the design of the turbine, and partly upon the pressure at which the gas is delivered to the turbine, and partly on the work done by the turbine) this turbine is particularly adapted for driving high speed machinery, such as cream separators.

For adjusting the cam 17 longitudinally with respect to its shaft 14, various means may be employed. I have indicated for the purpose a rocker arm 21 engaging a groove 22 in said cam and mounted upon a rock shaft 23 arranged to be operated by a hand lever 24. A dog 25 engaging one or another of a number of notches in a sector 26, serves to hold the cam fixed in any position to which it may be adjusted. When the cam is in the position shown in Fig. 1, the rise of such cam does not engage the valve rod 18, and therefore the valve 13 is out of action. Under such conditions the engine operates as an ordinary engine, the turbine remaining stationary. To set the turbine into operation, the cam is shifted, by means of the lever 24, so as to bring a suitable portion of the rise of the cam 17 opposite the end of the valve rod 18; and by adjusting the cam, said valve 13 may be caused to remain open a greater or less proportion of the working stroke of the engine, as desired. It is desirable to inject water or steam into the gas passing to the turbine, and to that end I provide for that purpose a valved connection 27. The water injected through this connection 27 into the chamber 10 mingles with the hot high pressure gases in said chamber and is immediately converted into steam by the heat of such gases, the gases being at the same time cooled, and this steam having greater specific gravity than the gases from the engine cylinder, acts with said gases very effectively on the vanes of the turbine, besides reducing the velocity of the gases and their temperature, and so making their action on the rotor more efficient, and quenching any flame that may exist in such gases. When water is so injected into the gases the turbine operates as a combined gas and steam turbine.

What I claim is:—

1. The combination with a cylinder of an internal combustion engine provided with means for the exhaust of products of combustion, of a turbine, a duct connecting the said cylinder to the said turbine, and means controlling flow through said duct arranged to permit flow from said cylinder to the turbine during the early portion of the working stroke.

2. The combination with a cylinder of an internal combustion engine provided with means for the exhaust of products of combustion, of a turbine, a duct connecting the said cylinder to the said turbine, and valve means controlling flow through said duct arranged to permit flow from said cylinder to the turbine, and to cut off prior to the completion of the working stroke in said cylinder.

3. The combination with a cylinder of an internal combustion engine provided with means for the exhaust of products of combustion, of a turbine a duct connecting the said cylinder to the said turbine, and valve means controlling flow through said duct arranged to permit flow from said cylinder to the turbine, and to cut off prior to the completion of the working stroke in said cylinder, and means for varying the period during which such valve remains open.

4. The combination, with an internal combustion engine provided with means for the exhaust of products of combustion, of a turbine connected to said engine otherwise than through such exhaust means, to be operated by high pressure gas taken from the cylinder of that engine, and valve means controlling the supply of gas from such engine cylinder to such turbine, and arranged to open near but after the beginning of the working stroke in such engine cylinder and to close prior to the conclusion of such working stroke.

5. The herein described method of converting heat energy into power which comprises compressing and igniting within a suitable internal combustion engine a suitable explosive charge, passing a portion of such charge, while at high pressure, into a suitable turbine and causing such charge to do work against rotor vanes of the turbine, and prior to the action of such gases upon said vanes injecting liquid into such gases and by the heat of such gases converting the liquid into steam, and by the absorption of latent heat incident to such conversion, reducing the temperature of the gases, and causing a further portion of such charge to expand and do work within such internal combustion engine, and thereby to drive the same independent of said turbine.

6. The combination with a cylinder of an internal combustion engine provided with means for the exhaust of products of combustion, and with means for releasing a portion of the charge during the early portion of the working stroke of the engine, of a turbine connected to said engine to receive the charge so released during the early portion of the working stroke, and means for injecting liquid into the gas so passing to the turbine.

In testimony whereof I have signed this specification in the presence of two subscribing witnesses.

CARL C. THOMAS.

Witnesses:
A. G. CHRISTIE,
WM. BLACK.